United States Patent Office 3,126,367
Patented Mar. 24, 1964

3,126,367
METAL-COMPLEX DYES WITH HALOGEN-PYRIDAZONE RADICALS
Hans Ruprecht Hensel, Heidelberg, Hans Baumann, Ludwigshafen (Rhine), Arnold Tartter, Lambsheim, Pfalz, and Hermann Weissauer, Ludwigshafen (Rhine), Germany, assignors to Badische Anilin- & Soda-Fabrik Aktiengesellschaft, Ludwigshafen (Rhine), Germany
No Drawing. Filed May 2, 1962, Ser. No. 191,750
Claims priority, application Germany Jan. 29, 1960
5 Claims. (Cl. 260—146)

This invention relates to metal complexes of azo dyes which bear 4,5-dihalogenpyridazone-(6) radicals in the molecule, to a process for their production and to their use for dyeing textile materials of natural, semi-synthetic and fully synthetic materials.

The term "textile materials" includes fibers, filaments, threads, flock, woven and non-woven fabrics, sheeting and films. Natural materials include, for example, natural polyamides, such as wool and silk; semi-synthetic materials include, for example, materials of regenerated cellulose, such as rayon and rayon staple. Fully synthetic materials include especially the synthetic linear polyamides, such as nylon 6, nylon 66 and nylon 11, the synthetic linear polyurethanes and the esters and ethers of cellulose, such as cellulose-2½-acetate, cellulose triacetate and ethyl cellulose.

It is an object of this invention to provide new metal complex azo dyes which will dye the said textile materials brilliant shades with excellent fastness properties, in particular with excellent fastness to wetting, rubbing and light.

More specifically, the invention relates to metal complex azo dyes which contain one or more radicals of the general formula:

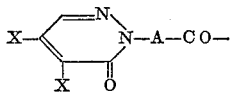

(I)

combined by way of an amino group to the remaining part of the dye molecule. In the said formula, X denotes a halogen atom, preferably a chlorine or bromine atom, A denotes a low molecular weight alkylene radical which may be substituted by other radicals, for example by alkyl and alkoxy radicals.

The new metal complex dyes according to this invention are for example obtained by reacting metal complex azo dyes containing acylatable amino groups with compounds of the general formula:

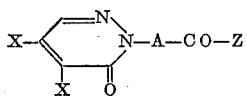

(II)

in which X and A have the meanings given above and Z stands for a halogen atom, preferably a chlorine atom.

Metal complexes of monoazo dyes are the most suitable azo dyes for the purposes of the said reaction but metal complexes of polyazo dyes, for example disazo and trisazo dyes, may also be used as initial materials.

The preferred dyes of the invention are copper, chromium and cobalt complexes which contain attached to said metal atoms 1 to 2 complex-forming azo dyes of the formula:

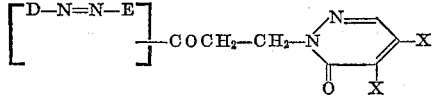

wherein D represents the radical of a diazo component of the benzene, naphthalene or indazole series, E represents a radical of a coupling component of the benzene, naphthalene, azobenzene, phenylazonaphthalene or phenylpyrazolone series, and X represents a chlorine or bromine atom.

The acylatable amino groups may be primary or secondary amino groups, and the dyes used may contain one or more acylatable amino groups.

Of the dyes containing acylatable amino groups those are preferably used which contain an amino group which can be reacted with acid halides and which is attached to the dye radical either directly or by way of a bridge member, such as a divalent aliphatic or aromatic radical. Particularly suitable initial materials for the production of the new dyes are those dyes in which the amino group which can be reacted with acid halides is attached to the dye radical by way of one of the following radicals:

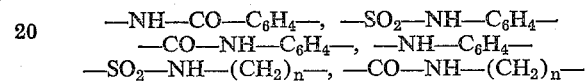

or —O—$(CH_2)_n$—, $n$ representing an integer from 2 to about 4.

If dyes containing water-solubilizing groups, for example sulfonic acid groups, sulfonic acid amide groups or carboxylic acid groups, are used as initial materials for the production of the new dyes according to this invention, water-soluble dyes are obtained. If the initial materials do not contain any substituents in the molecule which cause or increase the water solubility of these compounds, the new dyes prepared therefrom are insoluble or have little solubility in water.

Of the dyes according to the invention those are preferred which contain at least one water-solubilizing group.

The water-soluble new dyes are preferably used for dyeing wool and cellulose materials, such as cotton, rayon and rayon staple, whereas the dyes having little or no solubility in water are preferably used for dyeing synthetic textile materials, such as nylon 6, nylon 66, nylon 11 and polyethylene terephthalate. There are, however, exceptions to this rule.

Reaction of the dyes bearing amino groups with the above-specified acid halides is carried out under conditions usual for the reaction of acid halides with amines, for example in aqueous solution or slurry, in organic solvents or mixtures of water and organic solvents, advantageously in the presence of acid-binding agents, such as alkali hydroxides, alkali carbonates, alkali bicarbonates and alkali acetates, or tertiary bases, such as pyridine. In general, reaction in organic solvents or their mixtures with water is preferred.

The reaction may be conducted in homogeneous or heterogeneous phase. For example, the acid halide may be dissolved in a solvent miscible with water, for example in acetone, and the acetonic solution allowed to flow gradually into the aqueous solution of the dye. The reaction is preferably carried out at 10° to 15° C.; it is recommendable to maintain a pH value of between 6 and 7.

For acylation in heterogeneous phase, the solution of the acid halide in an organic solvent, for example in an aromatic hydrocarbon or in chloroform, as obtained in the preparation of the acid halide may be used without further working up. While stirring vigorously, the said solution is allowed to flow into the buffered aqueous solution of the dye, advantageously in the presence of a dispersing agent. The end point of the reaction may be determined by paper strip chromatograph and, in the case of aromatically bound amino groups, by testing the compounds to be acylated for diazotizability and by subsequent coupling.

Acid halides of the Formula II are obtained, for example, by adding hydrazine on to an α,β-unsaturated nitrile and reacting the resultant substituted hydrazine with a mucohalic acid. The 4,5-dihalogenpyridazones-(6) thus obtained, which have an alkyl-nitrile group in the 1-position, are then converted by saponification into the corresponding carboxylic acids and by subsequent halogenation into the carboxylic acid halides.

The new dyes are especially suitable for dyeing and printing the above-mentioned kinds of textile material as well as leather. It is expedient to coemploy basic-reacting substances when dyeing and printing with the new dyes. Such substances are, for example, alkali metal hydroxides, such as sodium hydroxide and potassium hydroxide, alkali metal carbonates, such as sodium carbonate and potassium carbonate, alkali metal bicarbonates, such as sodium bicarbonate, and alkali metal acetates, such as sodium acetate, potassium acetate and sodium chloracetate.

When dyeing with the new dyes, the procedure may be, for example, that materials of cellulose are padded with an aqueous solution of the dye and, advantageously after drying, passed through an aqueous bath containing a basic-reacting substance, such as sodium hydroxide, sodium carbonate, sodium bicarbonate, sodium trichloracetate, potassium hydroxide or potassium carbonate, and the dye is then fixed on the fiber by steaming for a short time. Instead of steaming, the material may be treated with air of between 70° and 200° C., preferably between 100° and 150° C., or the moist material padded with the coemployment of alkali hydroxides is allowed to stand for several hours at room temperature. The basic-reacting substance may, however, also be added to the padding bath. It is also possible to conduct dyeing with the new dyes, with the addition of basic-reacting substances and, advantageously, of neutral salts such as sodium chloride or sodium sulfate, at temperatures between 30° and 50° C. and to fix the dyes on the material by gradually raising the bath temperature. A further procedure consists in pretreating the cellulosic material with aqueous solutions of basic-reacting substances, drying the material, then dyeing it with the new dyes and fixing the dyes thereon.

In printing textile materials of cellulose, the dyes are advantageously brought onto the fiber together with a basic-reacting substance and thickening agents, such as sodium alginate or tragacanth, advantageously with the coemployment of a conventional printing auxiliary. The material is then dried at temperatures between 70° and 200° C., preferably between 100° and 150° C., or steamed for a short time. The materials may also be printed with the new dyes and a conventional printing auxiliary, dried, passed through an aqueous bath containing a basic-reacting substance, and then treated with air at temperatures between 70° and 200° C. or steamed at 105° C. It is also possible to pretreat the material with basic-reacting substances, print it with the new dyes together with thickening agents and, if desired, printing auxiliaries, and then dry or steam the material.

The invention is further illustrated, but not limited, by the following examples. The parts and percentages are by weight. Parts by volume have the same relation to parts by weight as the liter to the kilogram under normal conditions.

Example 1

22 parts of 4-chloro-2-aminophenyl-6-sulfonic acid are diazotized and coupled with 46 parts of β-(4,5-dichloropyridazone-(6)-yl)-propionylamino - 5 - hydroxynaphthalene-7-sulfonic acid. The resulting orange-red product (65 parts) is heated in aqueous solution with the equivalent amount of copper(II) acetate for 30 minutes at 40° C. A dye of the formula:

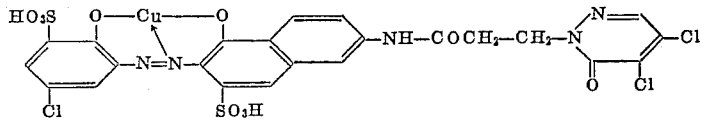

is obtained which dyes cotton red-violet shades.

Example 2

29 parts of 6-nitro-1-amino-2-hydroxynaphthalene-4-sulfonic acid are diazotized and coupled with 15 parts of 2-hydroxynaphthalene. The resulting dye is treated in aqueous solution with Cr(III) formate prepared from 8 parts $CrO_3$ and 10 parts of formic acid (85%). To an aqueous solution of the dye obtained, 30 parts of sodium hydroxide solution (50%) are added and the nitro groups of the dye are reduced by addition of 35 parts of sodium sulfide and heating the solution to 40° to 50° C. for 3 hours. Finally 30 parts of the dye containing an amino group is reacted at pH 7 with 40 parts of β-(4,5-dichloropyridazonyl)-propionyl chloride.

A dye with similar properties is obtained by using the equivalent amount of β-(4,5-dibromopyridazonyl-1)-propionyl chloride instead of β-(4,5-dichloropyridazonyl-1)-propionyl chloride.

β-(4,5-dichloropyridazonyl)-propionyl chloride is prepared as follows:

A mixture of 47.4 parts of β-(4,5-dichloropyridazonyl-1)-propionic acid of the formula:

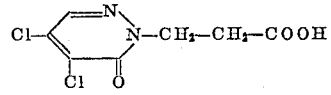

142 parts by volume of benzene and 71.4 parts of thionyl chloride is heated for three hours at the boil. Then the solvent and the excess thionyl chloride are distilled off on a water bath under reduced pressure, and the syrupy residue is dissolved in 70 parts by volume of acetone and the solution thus obtained used for further reaction.

β-(4,5-dichloropyridazonyl-1)-propionic acid is prepared as follows:

85 parts of 2-hydrazinopropionitrile (obtained by reaction of hydrazine hydrate with acrylonitrile) are allowed to flow into 500 parts of 8% hydrochloric acid, while stirring. 170 parts of mucochloric acid are added to this mixture, and the whole is heated for one hour at 90° C. After cooling, 210 parts of 1-(2-cyanoethyl)-4,5-dichloropyridazone-(6) are obtained as a colorless compound of the melting point 85° C.

β-(4,5-dichloropyridazonyl-1)-propionic acid of the melting point 127° C. is obtained by saponification of the said compound.

By reacting 2-hydrazinopropionitrile with the equivalent amount of mucobromic acid instead of with mucochloric acid and otherwise following the procedure described above, β-(4,5-dibromopyridazonyl - 1) - propionic acid is obtained, from which β-(4,5-dibromopyridazonyl-1)-propionyl chloride is prepared by reaction with thionyl chloride.

Example 3

A solution of 305 parts of β-(4,5-dichloropyridazonyl-1)-propionyl chloride in 100 parts of chloroform is run into a solution of 319 parts of 1-hydroxy-8-aminonaphthalene-3,6-disulfonic acid and 424 parts of sodium carbonate in 10,000 parts of water in the course of an hour, while stirring. After stirring for 12 hours at room temperature, the mixture is adjusted to pH 6 with acetic acid and then 120 parts of sodium chloride and 30 parts of potassium chloride are added. By filtering off by suction and drying 650 parts of a mixture whose content in 1-hydroxy-8-[β-(4,5-dichloropyridazonyl - 1) - propionyl]-aminonaphthalene - 3,6 - disulfonic acid is 480 parts as determined by titration with diazotized aniline.

By coupling a solution of 54 parts of the compound obtained by the method described in the foregoing paragraph and 45 parts of sodium carbonate in 100 parts of water with a diazo solution obtained from 15 parts of 2-amino-4-nitrophenol in conventional manner 65 parts of a red dyestuff of the formula:

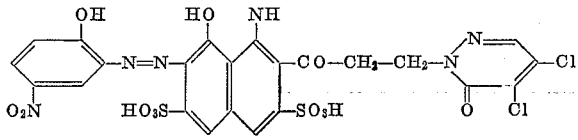

40 parts of this dyestuff and 30 parts of sodium acetate are stirred with 2500 parts of water at 80° C. and the solution is chromed by combining and boiling it for 6 hours with an aqueous solution of 160 parts of chromium chloride hexahydrate. By cooling and salting out with 300 parts of sodium chloride 88 parts of a chromium complex dyestuff are obtained which with acid-binding agents being added dyes cotton grey shades.

Example 4

A solution obtained by diazotization of 24 parts of 2-amino-4-chlorophenol-6-sulfonic acid is added to a 5% aqueous solution of 46 parts of 1-hydroxy-8-[β-(4,5-dichloropyridazonyl-1)-propionyl] - aminonaphthalene - 4-sulfonic acid obtained, as described in Example 3, by acylation of 1-hydroxy - 8 - aminonaphthalene-4-sulfonic acid with β-(4,5-dichloropyridazonyl-1)-propionyl chloride. The mixture is adjusted to pH 8 to 9 and allowed to stand for 2 hours at a temperature of 3° to 5° C. to complete coupling, when it is acidified with acetic acid and the product filtered off by suction. There are obtained 70 parts of a red dyestuff of the formula:

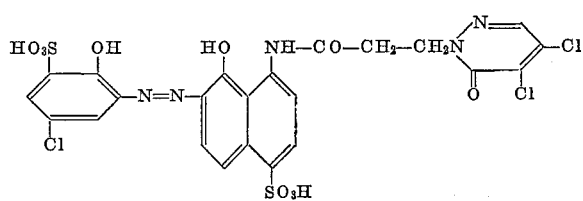

40 parts of this dyestuff are converted into the cobalt complex by boiling it with a solution of 15 parts of cobalt (II) acetate and 20 parts of sodium acetate in 1500 parts of water. The cobalt complex dyes cotton violet shades.

A dye with similar properties is obtained by using the equivalent amount of β-(4,5-dibromopyridazonyl-1)-propionyl chloride instead of β-(4,5-dichloropyridazonyl-1)-propionyl chloride.

Example 5

900 parts of β-(4,5-dichloropyridazonyl-1)-propionyl chloride are run into a solution of 565 parts of 1,3-diamino-benzene-4-sulfonic acid and 360 parts of potassium bicarbonate in 10,000 parts of water in the course of 2 hours at a temperature of 5° C. while stirring. Stirring is continued for 10 hours at room temperature and at the end of this time the mixture is adjusted to pH 6 with acetic acid. The product formed is filtered off by suction and washed with 2000 parts of water, 960 parts of 1-amino-3-[β-(4,5-dichloropyridazonyl-1)-propionyl]-aminobenzene-4-sulfonic acid being obtained.

40 parts of this compound are diazotized by dissolving it in 3000 parts of 0.03% causic soda solution, pouring the solution into a mixture of 130 parts of concentrated hydrochloric acid and 1500 parts of ice-water, adding gradually to the mixture an aqueous solution of 70 parts of sodium nitrite and stirring for 2 hours, when the diazo compound is run into a solution of 11 parts of 1,3-dihydroxybenzene and 20 parts of sodium hydroxide in 1000 parts of ice-water. This mixture is allowed to stand for 2 hours and then acidified until the mixture reacts acid to congo red. The red dye is filtered off by suction and the paste is again stirred with 1200 parts of water to which 50 parts of sodium carbonate are added and coupled with a diazo solution prepared from 19 parts of 2-aminophenol-4-sulfonic acid in conventional manner, 75 parts of a brown-red dyestuff of the formula:

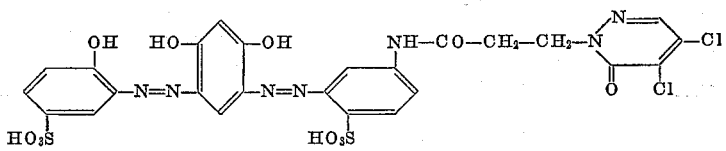

being obtained.

40 parts of this dyestuff are heated for 3 hours with a solution of 15 parts of chromium chloride hexahydrate and 25 parts of sodium acetate in 3000 parts of water, the mixture being then allowed to cool and salted out with 200 parts of potassium chloride. There are obtained 50 parts of a chromium complex dyestuff which dyes cotton red-brown shades.

A dye with similar properties is obtained by using the equivalent amount of β-(4,5-dibromopyridazonyl-1)-propionyl chloride instead of β-(4,5-dichloropyridazonyl-1)-propionyl chloride.

Metal complex dyes were also prepared from the azo dyestuffs enumerated in the following list (Examples 6 to 15). In these examples R means

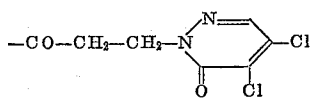

| | | | Shade of color on cotton |
|---|---|---|---|
| 6 | ![structure] O₂N, OH, HO, NH—R with HO₃S, HO₃S, SO₃H | Cu-complex | violet. |
| 7 | ![structure] HO₃S, OH, HO, NH—R with HO₃S, SO₃H | 1:2 Cr-complex | grey. |

| | | | Shade of color on cotton |
|---|---|---|---|
| 8 | [structure with HO₃S, OH, O₂N, H₃C, HO, N=N, NH—R] | 1:2 Cr-complex | orange. |
| 9 | [structure with COOH, HO, NH—R, SO₃H, N=N] | Cu-complex | claret. |
| 10 | [structure with O₂N, OH, HO, NH—R, HO₃S, HO₃S, N=N] | 1:2 Co-complex | red-violet. |
| 11 | [structure with R—HN, OH, HO, NO₂, NH₂, SO₃H, SO₃H, N=N] | Cu-complex | grey. |
| 12 | [structure with chlorobenzotriazole, HO, NH₂, NH—R, HO₃S, SO₃H, HO₃S, N=N] | Cu-complex | olive-green. |
| 13 | [structure with O₂N, OH, HO, NH₂, NH—R, HO₃S, HO₃S, SO₃H, HO₃S, N=N] | 1:2 Cu-complex | blue-grey. |
| 14 | [structure with chlorobenzimidazole, HO, NH₂, NH—R, HO₃S, SO₃H, N=N] | Cu-complex | blue-grey. |
| 15 | 1:2 mixed chromium complex from² [structure with OH, HO, NH—R, H₂NO₂S, HO₃S, SO₃H, N=N] + [O₂N, OH, H₂N, SO₃H, N=N] | | grey. |

Similar dyes are obtained by using, instead of β-(4,5-dichloropyridazonyl-1)-propionyl chloride, the equivalent amounts of β-(4,5-dibromopyridazonyl)-propionyl chloride.

Illustrative of the dyes of the invention are water-soluble metal complex dyes selected from the class consisting of copper, chromium and cobalt complexes which contain one complex-forming azo dye molecule attached to copper and two complex-forming azo dye molecules attached to cobalt and chromium, said azo dyes being of the formula:

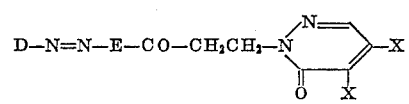

wherein:
D represents a radical selected from the class consisting of

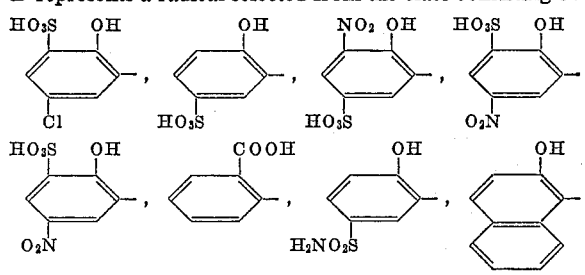

and

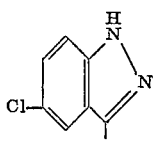

E represents the radical selected from the class consisting of

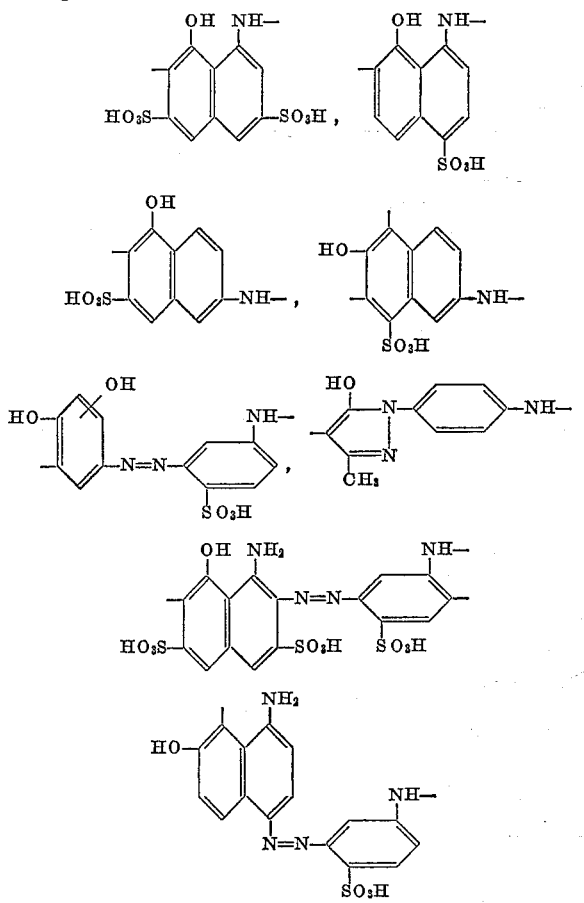

and

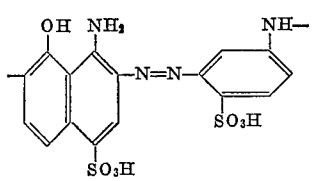

wherein the —OH groups in the fifth formula of E stand in metaposition to each other, and X represents a member selected from the group consisting of chlorine and bromine.

This application is a continuation-in-part of our application Serial Number 84,524, filed January 24, 1961.

We claim:
1. A water-soluble metal complex dye selected from the group consisting of copper complexes, chromium complexes and cobalt complexes which contain attached to said metal atoms 1-2 complex-forming azo dyes of the formula

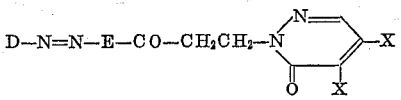

wherein D is selected from the group consisting of

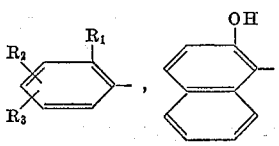

and

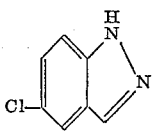

wherein $R_1$ is selected from the group consisting of —OH and —COOH, $R_2$ is selected from the group consisting of hydrogen, —SO$_3$H, —Cl, —NO$_2$, and —SO$_2$NH$_2$, and $R_3$ is selected from the group consisting of hydrogen and —SO$_3$H; wherein E is selected from the group consisting of

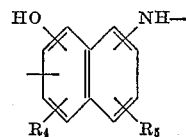

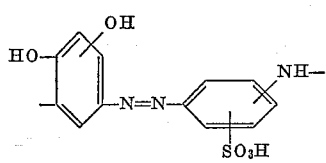

wherein the —OH groups stand in meta-position to each other,

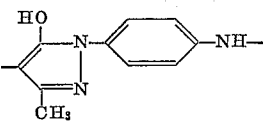

and

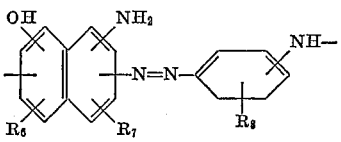

wherein $R_4$, $R_5$, $R_6$, $R_7$ and $R_8$ are each independently selected from the group consisting of hydrogen and —SO$_3$H, wherein at least one of $R_4$ and $R_5$ and at least one of $R_6$, $R_7$ and $R_8$ is —SO$_3$H, wherein the valence bond and an —OH group of the naphthalene rings in the foregoing formulae are located on contiguous carbons of the naphthalene ring, and wherein the —NH— groups are attached to the —CO— group attached to E; and wherein X represents a member selected from the group consisting of chlorine and bromine, said metal complex dye containing one molecule of said complex-forming azo dyes attached to copper and two molecules of said complex-forming azo dyes attached to chromium and cobalt.

2.
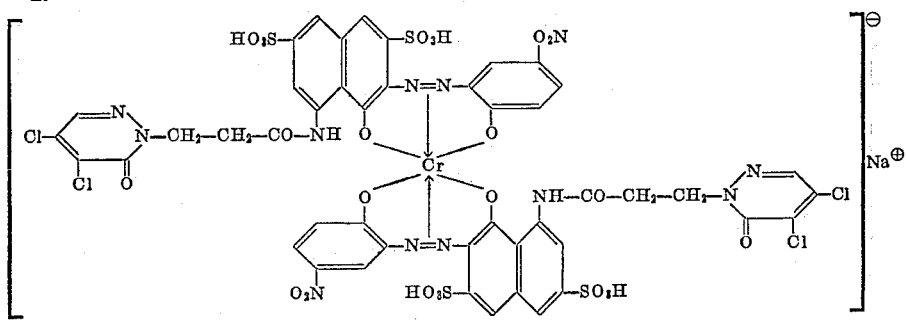
3.
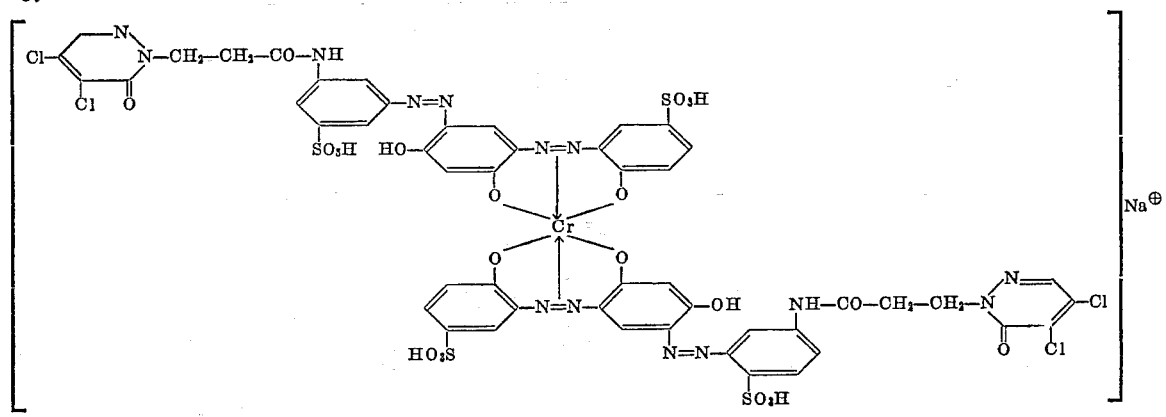
4.
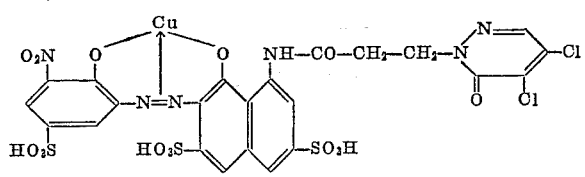
5.
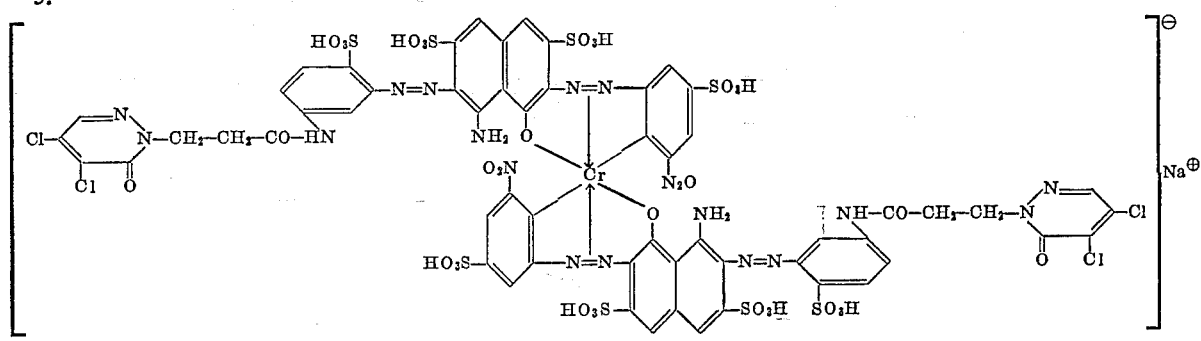
No references cited.

UNITED STATES PATENT OFFICE
CERTIFICATE OF CORRECTION

Patent No. 3,126,367            March 24, 1964

Hans Ruprecht Hensel et al.

It is hereby certified that error appears in the above numbered patent requiring correction and that the said Letters Patent should read as corrected below.

Column 5, lines 9 to 14, the right-hand portion of the formula should appear as shown below instead of as in the patent:

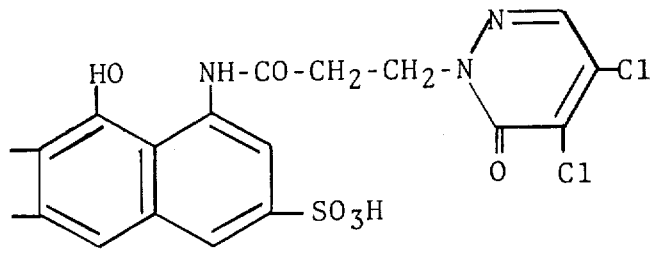

columns 7 and 8, in the table, second column, the upper left-hand portions of the formulas opposite Examples 12 and 14, each occurrence, should appear as shown below instead of as in the patent:

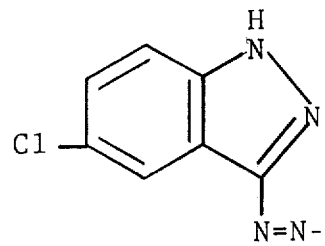

same table, second column, opposite Example 13, for "1:2 Cu-complex" read -- 1:2 Cr-complex --; same table, second column, opposite Example 15, for "1$^2$2 mixed chromium complex from$^2$" read -- 1:2 mixed chromium complex from: --; column 9, lines 3 to 7, the last formula should appear as shown below instead of as in the patent:

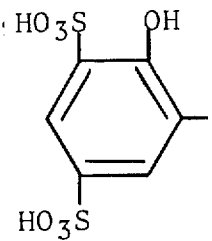

same column 9, lines 45 to 50, the right-hand portion of the formula should appear as shown below instead of as in the patent:

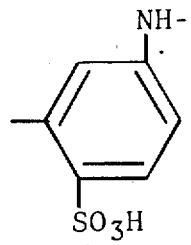

column 10, lines 20 to 25, the formula should appear as shown below instead of as in the patent:

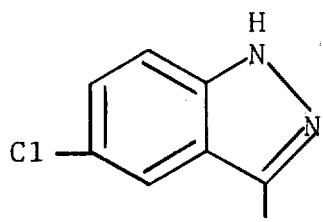

same column 10, line 62, for "$R_6$", first occurrence, read -- $R_5$ --; columns 11 and 12, claim 3, the upper left-hand portion of the formula should appear as shown below instead of as in the patent:

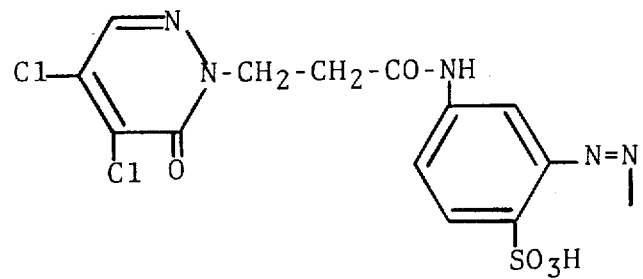

same claim 3, the closing bracket should appear as shown below instead of as in the patent:

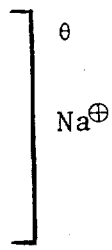

same columns 11 and 12, claim 5, the central portion of the formula should appear as shown below instead of as in the patent:

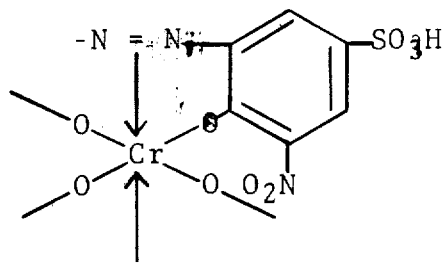

Signed and sealed this 20th day of October 1964.

(SEAL)
Attest:

ERNEST W. SWIDER
Attesting Officer

EDWARD J. BRENNER
Commissioner of Patents